Jan. 30, 1968  R. G. McCUE  3,365,815
PROJECTION OF ATOM, MOLECULE AND RADICAL MODELS
Filed July 23, 1965  2 Sheets-Sheet 1

INVENTOR
Ronald Gilbert McCue

BY *Olive H. Bramlow*
ATTORNEY

Jan. 30, 1968     R. G. McCUE     3,365,815
PROJECTION OF ATOM, MOLECULE AND RADICAL MODELS
Filed July 23, 1965     2 Sheets-Sheet 2

INVENTOR
Ronald Gilbert McCue

BY *Olive H. Bramson*
ATTORNEY

United States Patent Office 3,365,815
Patented Jan. 30, 1968

3,365,815
PROJECTION OF ATOM, MOLECULE AND RADICAL MODELS
Ronald Gilbert McCue, Commack, N.Y., assignor of fifty percent to Virginia L. Mullin, Huntington Station, N.Y.
Filed July 23, 1965, Ser. No. 474,409
6 Claims. (Cl. 35—18)

ABSTRACT OF THE DISCLOSURE

An educational device for use as an aid in teaching chemistry having a plurality of atom and skeletal radical models, said skeletal models having openings therethrough wherein said atom models can be received to form chemical radical models by placement of selected atom models within said openings.

---

This invention relates generally to teaching models and more particularly to unique structural elements utilized in the representation of chemical substances and the employment of such elements in cooperation with overhead image-projecting means.

Whereas visual educational aids have long been used in teaching the chemistry art, such aids have had marginal instructional value, often confusing the concept being taught or, at the least, introducing undesirable complexities thereinto.

Accordingly, and consonant with the foregoing, the instant invention has for an object the provision of a novel and improved device for teaching chemistry utilizing a truly visual approach.

Another object of the present invention is to provide a plurality of discs which may be readily manipulated upon a planar surface and which may be interconnected to visually illustrate the chemical bond relationships among the various chemical elements.

A further object of this invention resides in the provision of unique skeletal radical models formed of circular units wherein the component atoms theerof are removably contained within the circumferential periphery thereof.

Another object of the present invention is to provide a device in accordance with the foregoing which includes means for projecting the models of the chemical substances and for supporting said models whereby manipulation thereof may be readily accomplished.

Still another object of the instant invention is to provide a plurality of discs representative of chemical elements and radicals, each of said discs having respective numbers of apertures adjacently of the peripheries thereof, the total number of apertures provided throughout each disc indicating the valence electrons of the outer shell.

Another object of the invention resides in the provision of a novel container for the components utilized therein, the cover of said container having the periodic table of the chemical elements provided thereon, said cover further serving as the support for selected components as they are being manipulated beneath the overhead projector.

Another general object of the present invention is to provide a device of the described character which is simple in structure, economical of manufacture, and highly effective in use.

Other objects and advantages of the instant teaching device will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate an embodiment of the invention, and together with the description, serve to explain the principles of the invention.

It will be appreciated that the atom, radical and compound models and the chemical reactions illustrated in the accompanying drawings are exemplary and explanatory, there being no intended limitations on the number of and nature of the substances and reactions demonstrable, using the present invention.

The invention is essentially comprised of a plurality of atom and skeletal radical models generally designated by numerals 2 and 4, respectively, in the accompanying drawings. As shown, each model is preferably of circular disc configuration and includes at least one aperture 6 disposed therethrough adjacently of the circumferential periphery thereof, the total number of apertures within each respective atom or radical model being representative of the valence thereof.

Figure 4:
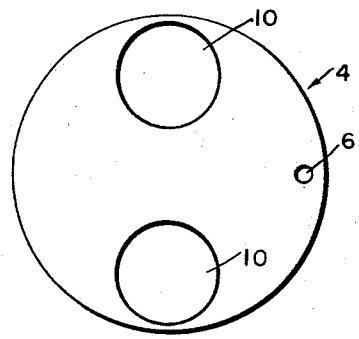
FIGURE 4 is a plan view of a skeletal radical disc adapted to receive the smaller oxygen and hydrogen discs to form the hydroxyl radical.
Figure 8:
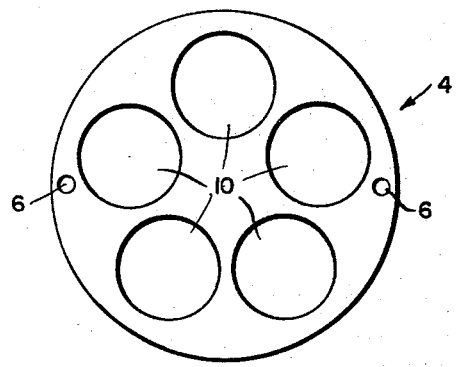
FIGURE 8 is a plan view of a skeletal radical disc adapted to receive the smaller sulphur and oxygen discs to form the sulphate radical.
Figure 5:
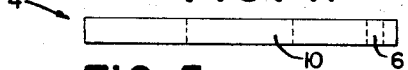
FIGURE 5 is a side elevational view of the disc shown in FIGURE 4.
Figure 9:
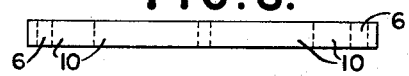
FIGURE 9 is a side elevational view of the disc shown in FIGURE 8.
Figure 6:
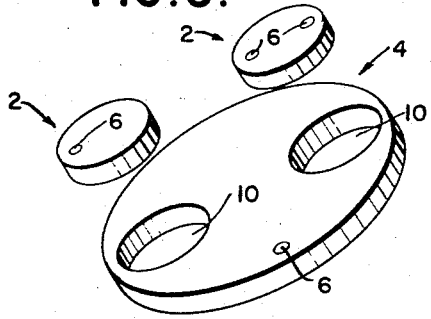
FIGURE 6 is an exploded perspective view of the components forming the hydroxyl radical.
Figure 10:
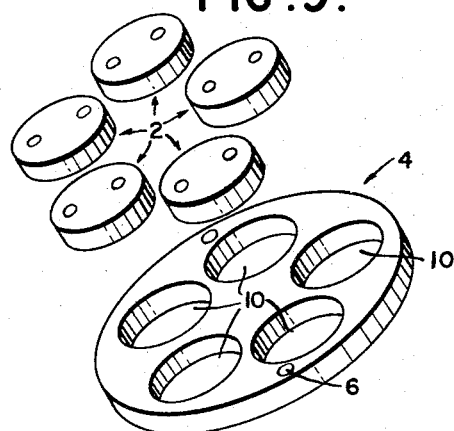
FIGURE 10 is an exploded perspective view of the components forming the sulphate radical.

With particular reference to FIGURES 4 and 8, it will be observed that the respective skeletal radical models shown each contain at least two circular openings 10 therethrough, said openings being symmetrically arranged with respect to the concentric axis of the respective skeletal model. It will be appreciated that the diameters of said atom models 2 are slightly smaller than the diameters of said openings 10 whereby said atom models are removably receivable within said openings. Accordingly, as illustrated in FIGURES 7 and 11, chemical radical models generally designated by numeral 12 are formed upon placement of selected atom models within the openings 10 of said skeletal radical models, the radical models thus formed having smooth, flat, uninterrupted surfaces.

Figure 7:
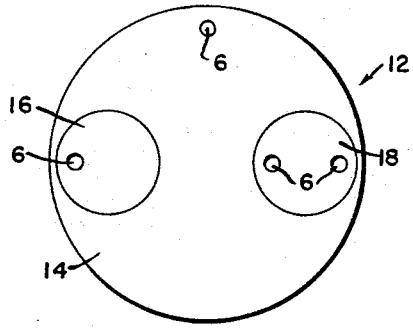
FIGURE 7 is a plan view of the fully assembled hydroxyl radical.

More particularly, the radical model specifically designated by numeral 14 in FIGURE 7 represents the hydroxyl radical (OH⁻) which has a valence of minus one. The element atoms which compose the hydroxyl radical are hydrogen and oxygen, atom models 16 and 18, respectively, constituting these atoms, the hydrogen atom model having one aperture 6 representing its valence of one and the oxygen atom model having two apertures 6, 6, representing its valence of two. The hydroxyl radical, however, comprised of the hydrogen and oxygen atom models, has a single aperture 6, representing its valence of one.

Figure 11:
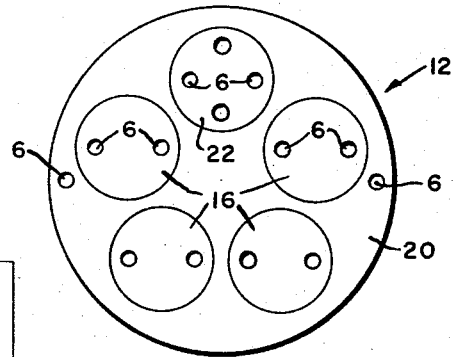
FIGURE 11 is a plan view of the fully assembled sulphate radical.

The radical model specifically designated by numeral 20 in FIGURE 11 further exemplifies another typical radical which is capable of being formed by the instant invention. The sulphate radical ($SO_4^{--}$) designated by numeral 20 includes two apertures thereby indicating that the sulphate radical has a valence of two. Four oxygen atoms 16 and one sulfur atom 22 compose the sulphate radical, the sulfur atom model 22 as shown having four apertures 6 representing its valence of four and each oxygen atom model as aforedescribed having two apertures 6 representing its valence of two. The sulphate radical 20, however, which is comprised of the sulfur and oxygen atom models, has two apertures representing its valence of two.

Figure 12:
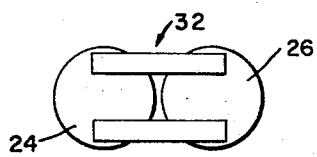
FIGURE 12 is a plan view of an assembled model of the lead oxide compound.
Figure 13:
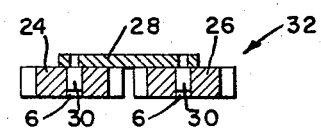
FIGURE 13 is an elevational cross-sectional view of the lead oxide model shown in FIGURE 12.
Figure 14:
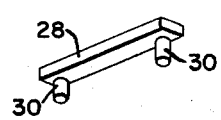
FIGURE 14 is a perspective view of a structural link used to bond the atoms and radical models to represent ionic bonds as shown in FIGURES 12 and 13.

As illustrated in FIGURES 12–14 of the drawings, individual atom models 24 and 26, representing, e.g., the lead ($Pb^{++}$) and the oxygen ($O^{--}$) atoms, respectively, may be united whereby their respective valences of two are satisfied by the double bond formed by utilizing a pair of elongate link members 28 as shown, said link members each having a projection 30 at the respective ends thereof as illustrated, said projections being received within apertures 6 of the respective said atom models to thereby form a molecule of lead oxide (PbO) generally designated by numeral 32.

Figure 1:
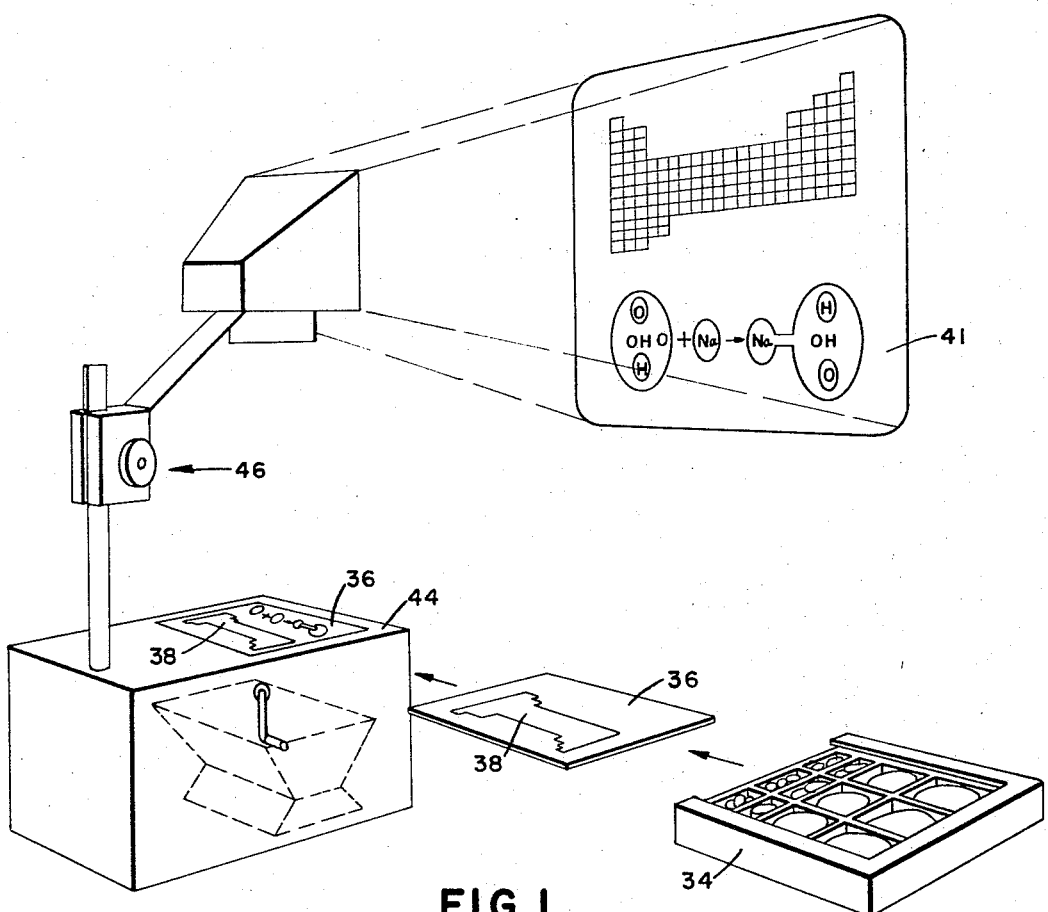
FIGURE 1 is a perspective view of the overhead projecting means, the container and components being il'ustrated, and the cover and selected components being shown positioned beneath said overhead projecting means.
Figure 2:
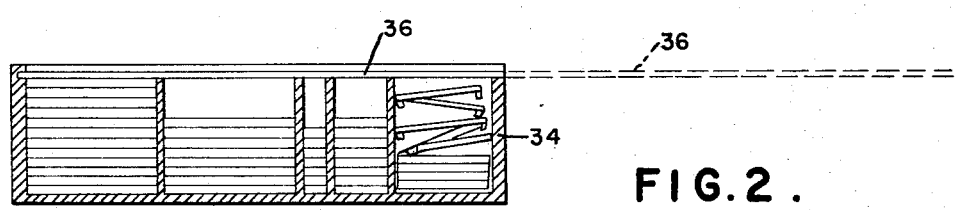
FIGURE 2 is an elevational cross-sectional view of the container and the components therein, the removable nature of the cover being illustrated.
Figure 3:
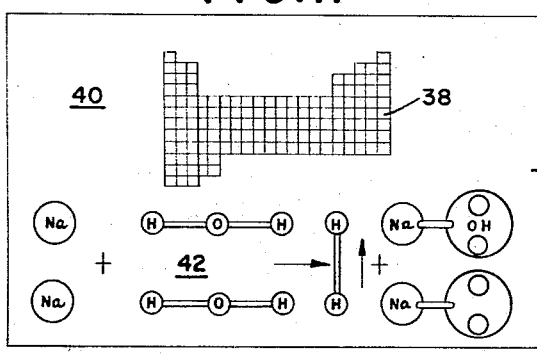
FIGURE 3 is a plan view of said container cover, illustrating the periodic table provided thereon and selected components arranged to illustrate the synthesis of sodium hydroxide.

The combination comprising the instant invention further includes a container 34 illustrated in FIGURES 1–3 and a transparent flat removable cover member 36, the latter being preferably slidably connected to said container as shown. The periodic chart of the chemical elements 38 is integrally provided upon the upper half 40 of said cover member as shown, e.g., in FIGURE 3, said chart being preferably etched thereon for projection upon a screen or other image-receiving surface 41 as hereinbelow described. The atom, skeletal radical and radical models are movably arrangeable upon the lower half 42 of said cover member as shown.

Whereas the cover member 36 is flat and transparent, it is advantageously receivable upon subject platform 44 of overhead projector 46, whereby said periodic chart and the model arrangements will be projected in enlarged form upon a screen or other suitable surface, said model arrangements being manipulated by the instructor to provide a truly visual presentation of chemical reactions and the nature of the chemical elements and radicals.

The atom and skeletal models are preferably constructed of transparent plastic material which is suitably colored to facilitate distinction among the models and to afford a color presentation which enhances reception of the lesson by the students. The models, however, may suitably be opaque whereby the presentation will consist of images which, e.g., emphasize the absence of an atom model belonging in a radical model.

The identification of each model may be accomplished by provision of the proper chemical symbol upon the model. FIGURE 3, therefore, which upon the cover member 36 illustrates the replacement of the hydrogen in water by sodium characterized by the equation:

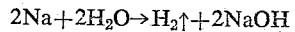

$$2Na + 2H_2O \rightarrow H_2\uparrow + 2NaOH$$

includes the chemical symbol upon each of the models utilized. The arrows, plus signs, etc., are suitably written upon the cover member as required as shown. Further, each model may have the proper electrical charge imprinted thereon although the valence-indicating apertures 6 will generally be sufficient where the instructor either orally or in writing designates the nature of the change.

Although the preferred embodiment of the instant invention has been described, it will be understood that within the purview of this invention various changes may be made in the forms, details, proportion and arrangement of parts, the combination thereof and mode of operation, which generally stated, consists in a device capable of carrying out the objects set forth, as disclosed and defined in the appended claims.

What is claimed is:

1. An educational device for use as an aid in teaching chemistry comprising in combination, a plurality of atom and skeletal radical models, each model being of circular disc configuration and having at least one aperture disposed therethrough adjacently of the circumferential periphery thereof, said skeletal models each having at least two circular openings therethrough, said openings being symmetrically arranged with respect to the concentric axis of the skeletal model, the diameter of said atom models being slightly smaller than the diameter of said openings whereby said atom models are removably receivable within said openings, and whereby chemical radical models are formed upon placement of selected atom models within said openings, the chemical radical models thus formed having smooth, flat, uninterrupted obverse and reverse surfaces, the apertures within said chemical radical models being representative of the valence thereof.

2. An educational device for use as an aid in teaching chemistry comprising in combination, a container, a transparent slidably removably flat cover member for said container, the periodic chart of the chemical elements being integrally provided upon approximately one-half of said cover member, a plurality of atom and skeletal radical models removably stacked within said container, each model being of circular disc configuration and having at least one aperture disposed therethrough adjacently of the circumferential periphery thereof, said skeletal models each having at least two circular openings therethrough, said openings being symmetrically arranged with respect to the concentric axis of the skeletal model, the diameters of said atom models being slightly smaller than the diameter of said openings whereby said atom models are removably receivable within said openings, and whereby chemical radical models are formed upon placement of selected atom models within said openings, the chemical radical models formable thereby having smooth, flat, uninterrupted obverse and reverse surfaces, the apertures within said chemical radical models being representative of the valence thereof, said atom and radical models being movably arrangeable upon the other half of said cover member, the latter being receivable upon the subject platform of an overhead projector for enlarged projection upon an image-receiving surface.

3. An educational device for use as an aid in teaching chemistry comprising in combination, a plurality of atom and skeletal radical models, each model being of circular disc configuration and having at least one aperture disposed therethrough adjacently of the circumferential periphery thereof, said skeletal models each having at least two circular openings therethrough, the diameters of said atom models being slightly smaller than the diameter of said openings whereby said atom models are removably receivable within said openings, and whereby chemical radical models are formed upon placement of selected atom models within said openings, and a plurality of elongate link members, a projection at each end of said link members, said projections being removably receivable within said at least one aperture of said models whereby the latter may be selectively connected, the total number of apertures in each model being representative of the valence of each said model.

4. An educational device for use as an aid in teaching chemistry comprising combination, a plurality of atom and skeletal radical models, each model having at least one aperture disposed therethrough adjacently of the periphery thereof, said skeletal models each having at least two openings therethrough, said atom models being removably receivable within said openings, and whereby chemical radical models are formed upon placement of selected atom models within said openings, and a plurality of link members, the latter being removably connectible to said at least one aperture of each said models whereby the latter may be selectively connected to form compound molecule models.

5. An educational device as set forth in claim 4 wherein said skeletal radical and atom models are constructed of transparent material.

6. An educational device as set forth in claim 4 wherein at least some of said skeletal radical and atoms models are constructed of opaque material.

References Cited

UNITED STATES PATENTS

| | | | |
|---|---|---|---|
| 522,082 | 6/1894 | Nichols | 35—45 |
| 2,841,889 | 7/1958 | Coale et al. | 35—30 X |
| 2,961,779 | 11/1960 | Perry | 35—73 |

FOREIGN PATENTS 864,090   1/1941   France.

EUGENE R. CAPOZIO, *Primary Examiner.*

H. S. SKOGQUIST, *Assistant Examiner.*